BEER TAPPING DEVICE

Original Filed Nov. 5, 1968 2 Sheets-Sheet 1

INVENTOR
MACK S. JOHNSTON

BY Le Blanc & Shur
ATTORNEYS

BEER TAPPING DEVICE

Original Filed Nov. 5, 1968 2 Sheets-Sheet 2

INVENTOR
MACK S. JOHNSTON

BY Le Blanc & Shur
ATTORNEYS

United States Patent Office

Re. 27,627
Reissued Apr. 17, 1973

27,627
BEER TAPPING DEVICE

Mack S. Johnston, Rolling Hills, Calif., assignor to Draft Systems, Inc., Northridge, Calif.

Original No. 3,497,114, dated Feb. 24, 1970, Ser. No. 773,380, Nov. 5, 1968, which is a continuation-in-part of Ser. No. 676,291, Oct. 18, 1967. Application for reissue Dec. 31, 1970, Ser. No. 103,352

Int. Cl. B67d *5/54*

U.S. Cl. 222—400.7 17 Claims

Matter enclosed in heavy brackets [ ] appears in the original patent but forms no part of this reissue specification; matter printed in italics indicates the additions made by reissue.

ABSTRACT OF THE DISCLOSURE

Disclosed is a beer tapping device including an improved adapter for attachment in the beer outlet of a standard keg. The adapter is an all-metal brazed construction insertable from outside the keg with laterally offset liquid and gas passageways terminating within the keg. Also disclosed is a novel metallic valve retainer assembly which also segregates the beer and gas passageways in the adapter. A novel double seal construction on the coupling unit probe is also provided. The adapter is retained about the keg opening by an annular collar which is formed of tubular stock parts brazed one to the other. The adapter body is comprised of parts also formed from tubular and bar stock whereby an all-metal brazed and comparatively inexpensive construction is afforded.

This application is a continuation-in-part of copending application Ser. No. 676,291, filed Oct. 18, 1967, for "Beer Tap," now abandoned, which application is a continuation-in-part of copending application Ser. No. 611,610, filed Jan. 25, 1967, for "Beer Tapping Device" (issued Nov. 12, 1968, as U.S. Letters Patent No. 3,410,458); said application Ser. No. 611,610 being in turn a continuation-in-part of application Ser. No. 587,-627, filed Oct. 18, 1966, for "Tapping Device for Beer Kegs and the like" (issued Jan. 14, 1969, as U.S. Letters Patent No. 3,422,448), which application Ser. No. 587,627 is a continuation of application Ser. No. 406,682 (now abandoned), filed Oct. 27, 1964, for "Siphon Device for Beer Kegs and the Like"; said application Ser. No. 406,682 being in turn a continuation-in-part of application Ser. No. 395,084 (issued Jan. 25, 1966, as U.S. Letters Patent No. 3,231,154), filed Sept. 8, 1964, for "Siphon Device for Beer Kegs and the Like," and application Ser. No. 150,982 (now abandoned), filed Nov. 8, 1961, for "Siphon Device for Beer Kegs and the Like"; said application Ser. No. 395,084 being in turn a continuation of [said] application Ser. No. 150,982, (*now abandoned*), *filed Nov. 8, 1961 for "Siphon Device for Beer Kegs and the Like."* [This application is also a continuation-in-part of copending application Ser. No. 551,744, filed May 20, 1966, for "Beer Tapping Device," which is a continuation-in-part of application Ser. No. 406,682 (now abandoned), filed Oct. 27, 1964, for "Siphon Device for Beer Kegs and the Like"; said application Ser. No. 406,682 being in turn a continuation-in-part of application Ser. No. 395,084 (issued Jan. 25, 1966, as U.S. Letters Patent No. 3,231,154), filed Sept. 8, 1964, for "Siphon Device for Beer Kegs and the Like," and application Ser. No. 150,982 (now abandoned), filed Nov. 8, 1961, for "Siphon Device for Beer Kegs and the Like" said application Ser. No. 395,084 being in turn a continuation of said application Ser. No. 150,982.]

The present invention relates to a new and improved tapping device for drawing liquid such as beer from containers such as beer kegs or barrels, using a gas to drive the fluid from the container. In particular, the invention relates to a new improved tapping device usable with conventional beer kegs such as the so-called "Peerless" systems, and particularly to a sub-unit called a "keg adapter" which constantly seals the keg and cooperates with another sub-unit called a "coupler" which is attached to the beer dispensing apparatus in a restaurant or tavern and is readily connected to the keg adapter so that the tapping device is automatically in operating condition.

Today, as in the past, the most widely prevailing practice in the beer industry is for a brewery to provide draft beer to retail outlets in "conventional kegs which, for the most commonly used "Peerless" system, have a three-quarter inch opening in the top closed with a bung in the form of a cork or plug. To dispense the beer from the keg, the bartender taps the keg by knocking or pushing in the bung and inserting an elongated tap rod with an associated "siphon" device for drawing the beer from the keg, these being fastened to the keg by means of a bayonet or like connection. This siphon device includes means for injecting compressed air or $CO_2$ through the tap rod into the keg to drive the beer through the siphon and also external valve means for respectively controlling flow of gas into the keg and beer from the keg. A gas supply hose connects the siphon to a source of gas, and another hose connects it to the beer dispensing apparatus mounted on the counter or bar in the restaurant or tavern whereby the beer may be dispensed from the keg. When the beer has been withdrawn from the keg to the extent feasible, the bartender then removes the tap and siphon device from the keg, removes the keg from the dispenser cabinet, and installs a new keg and repeats the process of knocking or pushing in the bung and installing the tap rod and related siphon equipment. The same tap rod and siphon are used for every keg and must be washed and cleaned periodically to prevent fouling and contamination.

The prevailing practice in tapping a beer keg which has been used for fifty years has a number of disadvantages for the brewery, the dispensing establishment, and the public. These are set forth in more detail in my U.S. Patent No. 3,244,448 and application Ser. No. 406,682, filed Oct. 27, 1964, now abandoned.

Briefly, they include the fact that the kegs often become filled with insects, small animals, and debris of every sort. Yeast and other solids from the beer inevitably accumulate with the resultant accumulation of the destructive bacteria. Furthermore, a substantial quantity of beer is often lost during the tapping process. Other disadvantages include the fact that conventional tapping systems require a certain amount of strength and may be dangerous to the bartender so that it is more difficult to tend bars.

In my aforementioned U.S. Patent No. 3,422,448 and Ser. No. 406,682 filed Oct. 27, 1964, now abandoned, I have disclosed a new improved beer tapping device for dispensing beer or like liquids in kegs or barrels which overcomes the above-discussed and other problems and shortcomings of beer dispensing systems heretofore available and also provides a number of important advantages and improved results as hereinafter set forth. Particularly, the invention of such applications provides new, improved means for packaging and dispensing beer and like liquids in kegs utilizing an adapter assembly installed and sealed in the keg at the brewery with an also improved coupler subassembly which is fastened to the keg adapter by the tavern keeper or bartender, thus automatically breaking the seal and readying the keg for dispensing of beer. Simple removal of the aforementioned coupler subassembly by the bartender causes the keg to automatically reseal, thereby positively preventing the entry of trash and other foreign objects. In addition, the beer is positively prevented from entering the gas passageway portion of the tapping device, thus preventing contamination or fouling of this portion of the device by dried beer residue, normally accumulating due to the surging of the beer.

In my U.S. Patent No. 3,410,458, there is disclosed a similar improved tapping device including an adapter sub-unit having a transition element forming a part of separate liquid and gas passageways. In the device of that application, the liquid passage through the transition element has its lower end offset to take optimal advantage of the limited space available while, at the same time, rendering the adapter unit compatible with existing systems and particularly with existing cleaning equipment.

In copending application Ser. No. 676,291 filed Oct. 18, 1967, now abandoned there is disclosed an improved tapping device including a keg adapter having improved enlarged liquid and gas passageways, particularly useful in "series" beer keg installations. Specifically, a keg adapter of that application is compirsed of parts completely surrounded by metal, such as stainless steel or the like, and includes a locking mechanism for locking a metallic valve retaining insert in place as to maintain complete separation of gas and liquid passageways through the adapter. The keg adapter also includes a similar transition element as in U.S. Patent No. 3,410,458 and the keg adapter can be inserted from the top of the keg, avoiding any difficulties associated with prior units, many of which had to be inserted and assembled from the keg interior.

Accordingly, it is an object of the present invention to provide a further novel and improved beer tapping device and novel improved keg adapter subassembly and components for the same of the general type disclosed and claimed in my aforesaid copending applications Ser. Nos. 406,682 and 676,291 and U.S. Patents Nos. 3,422,-448 and 3,410,458 as to provide additional improvements in the construction, mode of operation and result as set forth below.

It is another object of the present invention to provide an all-metal keg adapter (with the exception of the valve seat and gas check valve described hereinafter) having relatively simplified and inexpensively manufactured parts which, when assembled, provide an all-metal integral keg adapter construction, the keg adapter having improved enlarged liquid and gas passageways adapting the tapping device particularly for use in a series beer keg installation. It is a related object of the present invention that such parts as comprise the keg adapter and which are welded one to the other as by brazing to provide the all-metal construction thereof, may be inexpensively formed from readily available tubular and bar stock as applicable.

It is still another object of the present invention to provide an improved tapping assembly and particularly an improved keg adapter subassembly in which the parts thereof are formed of metal and welded, specifically brazed, one to the other to form an integral metal adapter unit. Keg adapter assemblies thus formed have increased strength and eliminate and/or minimize the areas in similar keg adapter units (wherein the parts are screw threaded one to the other or screwed otherwise than to form a unitary integral construction) which readily pack yeast and other solids of the beer thereby permitting the growth of bacteria and generally contaminating the entire unit. In addition, by forming a unitary, all-metal unit, the keg adapter may be readily cleaned.

Another object of the present invention is to provide an improved beer tapping device and adapter assembly therefor having an improved mechanism for locking the valve retaining metal insert in place as to maintain a complete separation of the gas and liquid passages through the adapter. Whereas the metal insert in my copending application Ser. No. 676,291 is retained in the keg adapter by a pair of locking pins, it has been found that an inexpensive and readily constructed locking ring can be provided and which can effectively perform this function. Moreover, the locking ring may be readily inserted into the keg adapter without unduly inhibiting the gas passage between the metallic insert and the keg adapter tubular body thereby retaining the enlarged gas passageway necessary, for example, when the tapping device hereof is employed in a series beer keg installation.

A further object of the present invention is to provide a unique improved sealing assembly on the probe of the coupler unit which provides an effective double seal arrangement separating the gas and liquid passages, prevents spitting of the beer when the coupler unit is disassembled from the keg adapter prior to reseating of the liquid valve in the keg adapter, and maintains the gas-liquid seal should the lower seal abrade or otherwise wear and become ineffective thereby preventing the beer from becoming wild and precluding entry of beer into the gas passages.

Still further objects of the present invention are to provide a new and improved tapping device for kegs or the like which achieve the above-discussed objects and advantages and which also include a siphon tube, the lower end of which flares outwardly to improve ingress of beer from the keg into the siphon tube and through the keg adapter; a two part retaining collar construction unitarily connected one to the other, each part of which is formed of readily available tubular stock wherein the unitary collar thus formed replaces the customarily machined and expensive bar stock collar construction previously employed for like purposes on similar tapping units; a unique bottom plate construction integrally connected to the lower end of the keg adapter thereby preventing ingress of gas or fluid into the keg adapter otherwise than by the gas and liquid passageways; a novel means of connecting the gas check valve to the keg adapter, the gas check valve comprising a flexible envelope having elongated slits; and, in general, the reduction in cost of the entire tapping device as compared with the cost of similar units heretofore available.

These and further objects and advantages of the present invention will become more apparent upon reference to the following specifications, claims and appended drawings wherein:

Figure 1:
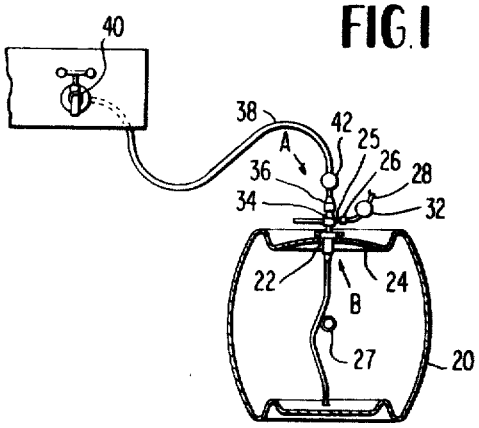
FIGURE 1 is a schematic view showing the novel packaging and dispensing tapping device of the present invention as installed in a beer keg associated with the beer dispenser in a so-called "Peerless" type system in conjunction with a source of gas under pressure; the beer keg being broken away and shown in cross section for ease of illustration.
Figure 4:
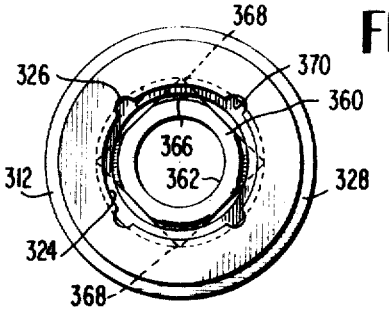
FIGURE 4 is a plan view of the keg adapter.

The beer or similar tapping device of the present invention is, in many respects, similar to that disclosed and claimed in my copending application Ser. No. 676,291 filed Oct. 18, 1967, now abandoned. Like parts bear like reference numerals to the extent feasible. The disclosure of each copending application Ser. No. 676,291 filed Oct. 18, 1967 and application Ser. No. 406,687 filed Oct. 27, 1964 and U.S. Patents Nos. 3,422,448 and 3,410,458 are, in their respective entireties, incorporated herein by reference as though herein fully set forth.

Referring to the instant drawings especially to FIGURE 1, there is schematically shown a conventional beer keg of the so-called "Peerless" type having an opening 22 in its top wall 24 in which opening there is received the adapter unit B of the present invention, this unit being semi-permanently installed in keg 20. A normally closed cleaning opening 27 is formed in the side wall of the keg. Coupler unit A of the present invention can be readily connected with keg adapter unit B to form a tapping assembly as hereinafter amplified. The dispenser coupler unit A has a gas inlet port and fitting 25 adapted to receive a coupler 26 at the end of a gas supply tube 28 which communicates with a gas supply tank, not shown. If desired, a valve 32, of conventional type, may be provided for gas control at the location of keg 20. The dispenser coupler unit also has a beer exit fitting 34 threaded as at 35 in FIGURE 2 to receive a conventional coupler unit 36 at the end of an exible tube 38 through which beer is conducted to a conventional dispenser faucet 40. If desired, a suitable valve 42 may also be associated with the coupler 36 in the conventional manner for control of the beer flow at the keg 20. The arrangement of FIGURE 1 is shown merely for the purpose of illustrating usage of the present invention. Since the components thereof, other than units A and B, do not comprise a part of the present invention, further description thereof is believed unnecessary as dispensing arrangements for use with the new, improved tapping device hereof will be apparent to those skilled in the art in light of the disclosure herein.

Figure 2:
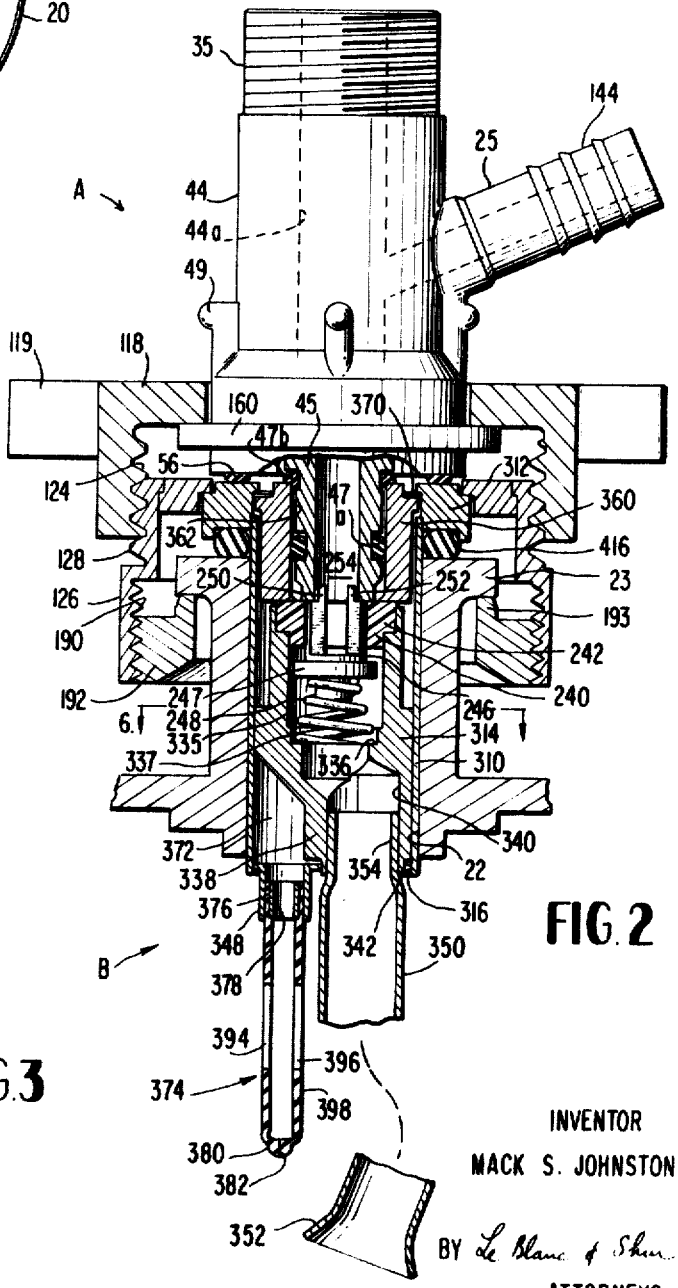
FIGURE 2 is a vertical cross section through a portion of the tapping device of FIGURE 1, particularly showing the details of the novel adapter unit and coupling unit probe illustrating the manner in which the adapter unit is mounted to the beer keg, the coupler unit mounted to the keg adapter, and the integral construction of the keg adapter.

Referring particularly to FIGURE 2, the new improved tapping device of the present invention comprises two main units A and B, herein generally called the "dispenser-coupler" and a "keg adapter," respectively. The dispenser-coupler unit A comprises a main cylindrical head portion 44 which is provided with a smooth, internal central bore 45 and carries an internally-threaded collar 118 for fastening the dispenser-coupler to the keg adapter unit B as explained below.

A tubular arm 144 having a central bore is preferably formed integral with head 44 and is adapted to receive the end of a piece of tubing 28 and connects the coupler unit A to the tank of pressurized $CO_2$ or air not shown. Coupler unit A also includes a generally cylindrical hollow probe 45 which is positioned within the bore 44a provided in head 44. The central bore of the probe forms the sole liquid passageway through the coupler unit A and incoming gas passes through the coupler in the annular area about the probe. A pair of different diameter sealing rings 47a and 47b are provided adjacent the lower end of probe 45 and seal the gas and liquid passageways one from the other in a manner more fully described hereinafter. Coupler head 44 is also provided with a plurality of projections 49 for positioning an aligning collar 118 on the head. The head 44 is preferably integrally formed of a plastic material while the probe 45 is preferably formed of stainless steel.

An annular member 160 is integrally formed on the lower end of head 44 and retains collar 118 between it and the projection 49, the collar 118 being rotatably mounted on the coupler head 44. The collar 118 has a plurality of handle portions 119 formed integrally therewith. Collar 118 is internally threaded at 124 for cooperation with the threaded portion 128 of an annular ring 126 and fits loosely on head 44 thereby permitting relative rotation between the collar and head. The bottom of the head carries an annular seal 56 which may be an "O-ring" of neoprene rubber for providing an annular seal between the coupler unit A and the upper surface of keg adapter unit B surrounding the beer and gas passages communicating between the coupler unit and the keg adapter.

Keg adapter B is held in the standard opening 22 of a "Peerless" type keg by means adapted to cooperate with the standard flange or collar 23 in a manner particularly shown in FIGURES 6a–6e of application Ser. No. 587,627. This securing means includes a ring 126 which has its lower end spaced slightly above the top of keg 20 and which is internally threaded at 190 to receive externally threaded ring 192 as more fully described in the aforementioned copending applications. Ring 192 includes a thin-walled section having upwardly-projecting diametrically opposite lugs 193 and a pair of inwardly-projecting diametrically opposed abutments, not shown, both formed on its periphery. To secure keg adapter B in the keg opening, ring 192 is snapped over the keg flange so that it rests on the top wall 24 of keg 20 with the lugs 193 extending upwardly. The ring 192 is aligned so that the depending lugs, not shown, on the flange fit between adjacent lugs and tabs on the ring. The keg adapter unit is checked to be sure that the adapter is properly positioned within keg opening 22. The ring 26 is then placed over the upper end of the adapter and aligned with the keg flange. Thereafter, the ring 126 is threaded on ring 192 so that the ring 192 is drawn up within the lower inside portion of ring 126 until the upper ends of the lugs 193 on ring 192 contact the underside of the keg flange with the abutments, not shown, engaging the depending lugs on the keg flange. Thus, when the rings 126 and 192 are assembled, they cooperate with the keg flange to securely lock keg adapter unit within the keg opening 22 to prevent any longitudinal or rotational movement of the adapter unit relative to the opening. Ring 192 may be inexpensively molded of plastic without sacrificing strength or ruggedness of the keg adapter unit B since the metal ring 126 completely protects the plastic securing ring 192 as well as the adapter unit. By removing one of the lugs and abutments, ring 192 may be made of metal and still slipped over the "Peerless" collar 23 to act in a similar manner.

Figure 3:
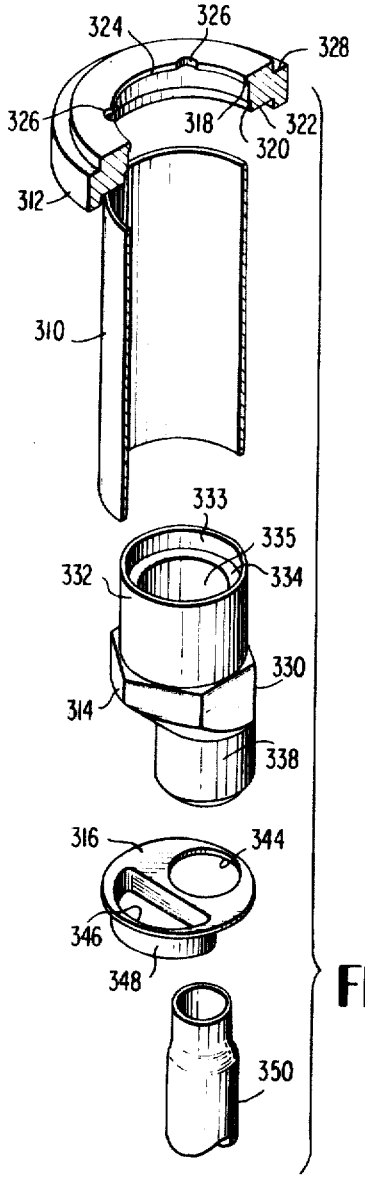
FIGURE 3 is an exploded perspective view of portions of the adapter subassembly of FIGURES 1 and 2, particularly illustrating the metallic parts thereof which are joined one to the other to provide an all-metal keg adapter construction (excepting certain valve parts) with isolated liquid and gas passages through the adapter.

Referring now particularly to FIGURES 2 and 3, the keg adapter unit B comprises a tubular s'eeve 310, an upper cyclindrical ring 312, a valve housing 314 and a lower closure plate 316. Sleeve 310 is formed from tubular stock to a diameter as to be readily receivable within the three-quarter inch opening 23 of the "Peerless" type keg, providing a snug fit therewith as seen in FIGURE 2. Ring 312 comprises an annulus which is internally stepped to provide a pair of shoulders 318 and 320, and an annular seat 322 for an O-ring seal 416 (FIGURE 2). The upper inner edge of ring 312 extends radially inwardly to form a lip portion 324 through which is provided four notches 326. The outer periphery of ring 312 is also stepped to provide an outer annular flange 328.

Valve housing 314 is comprised of an integral all-metal construction formed preferably from hex-bar stock having an intermediate body portion 330 retaining the external hexagonal configuration with the upper portion thereof being machined to form a cylindrical section 332 of reduced radius. Value housing 314 is internally bore through the upper end thereof to form a series of progressively diametrically reduced bore openings 333, 335 and 337 providing shoulders 334 and 336 for purposes as will become clear. The lower portion 338 of valve housing 314 is comprised of a cylindrical nipple portion 338 extending eccentrically from the intermediate hexagonal portion 330. Nipple portion 338 is axially bored as at 340 and communicates laterally with the bore openings formed through the top of valve housing 314 forming a through passage. Plate 316 comprises a circular disk having a laterally offset circular opening 344 of a diameter to receive the annular flanges 342, formed on the lower portion of nipple portion 338. Disk 316 is also provided with D-shaped opening 346 in plan view from which projects a similarly D-shapped nipple 348. Preferably, nipple 348 is formed integrally with disk 316 as by a drawing process. Keg adapter unit B also includes a siphon tube 350 which has an arcuate mid-section as seen in FIGURE 1 and a lower end which, when keg adapter B lies in final assembly within the keg 20, terminates adjacent the bottom of keg 20. The lower end of tube 350 is flared outwardly to form a conically tapered section as at 352 and this facilitates ingress of beer from the keg 20 into the siphon tube 350 without significantly contorting the beer path. The upper end of siphon tube 350 is diametrically reduced as by a swaging process to be receivable within the lower bore 340 of the eccentrically extending nipple portion 338 of housing 314.

To assemble the various parts of the keg adapter B thus described, ring 312 is disposed about the upper end of tube 310 with the annular end face of sleeve 310 butting shoulder 320. Valve housing 314 is inserted within sleeve 310 and may be retained therein by suitable means, as by a spot weld, prior to final securement thereof as hereinbelow amplified. Disk 316 is then inserted within the lower end of sleeve 310 with the anular flange 342 of nipple portion 338 being received through opening 344. The siphon tube 350 is then inserted within the bore 340 and it will be appreciated that both the disk 316 and siphon 350 may be spot welded to sleeve 310 and valve housing 314, respectively, prior to final securement of the parts comprising the keg adapter B as will now be described. The parts of this subassembly are then brazed one to the other by a suitable brazing process, for example by furnace brazing, with the result that the completed assembly as seen in FIGURE 2 forms an integral unit without the usual crevices, holes and the like normally associated with parts secured one to the other as by screw threads and otherwise than by integrally forming processes such as brazing.

Refering now to FIGURE 2, a valve is provided in the valve housing 314 and comprises a chuck washer 240 having a diametrically enlarged upper end 242, the lower annular face of which seats against shoulder 334 with the lower reduced diameter portion of washer 240 being received within intermediate bore opening 335. Received within the valve housing 314 is a bifurcated valve 246 comprised of a plate 247 around the lower reduced diameter end of which is wrapped one end of a helical compression spring 248. Bifurcations 250 and 252 of the valve 246 project upwardly through a central aperture 254 in chuck washer 240 for engagement with the nose of the probe 45 as seen in FIGURE 2. Valve 246 is normally closed by spring 248, pushing plate 247 against the underside of chuck washer 240 which forms the valve seat. The bifurcations or upwardly-extending arms 250 and 252 are notched at their upper ends to receive the lower end of the hollow probe 45 of the coupler unit A with the lips of bifurcations 250 and 252 being received within probe 45. When the spring 248 is compressed by the probe 45, beer is free to flow upwardly through the valve, i.e. around plate 247 and through the area between the bifurcated arms 250 and 252 into the hollow end of the probe 45. The lower end of compression spring 248 bears against the shoulder 336 formed on the valve housing 314.

Received within the upper end of sleeve 310 is a metal insert 360 having a substantially cubic configuration as illustrated as well as a central tubular bore 362 in coaxial alignment with the bores 333, 335 and 337 formed through valve housing 314. Insert 360 has the lower end of each of its four edges cut away as at 34 (FIGURE 5) to form curved or arcuate corners. The upper ends of the four corners are cut back as at 366 with a portion between the cut back portions 366 and arcuate corners 364 forming projecting shoulders 368 at each corner. Insert 360 is placed into the upper end of tube 310 and rotated until the shoulders 368 are aligned with and passed through the respective notches 326 in the top of the ring 312. A snap ring 370, having preferably a natural diameter greater than the diameter of the intermediate portion of ring 312 between shoulders 318 and 320 and preferably having an overlapping portion greater than three-quarters of its circumference, is radialy compressed and inserted through the opening at the upper end of rings 312 to bear against the upper ledges of shoulders 368. It will be readily seen that by releasing snap 370, it engages below annular lip 324 to clamp the insert 360 between lip 324 and the upper face of chuck washer 240 to maintain the latter in sealing engagement about the bore opening in valve housing 314. It will be readily appreciated that the arcuate configuration of the snap ring 370 and the cubic or square cross sectional configuration of the insert 360 cooperate to permit a gas passage along the four faces of the insert 360 communicating with the annular space between the cylindrical portion 332 and sleeve 310 which, in turn, lies in communication with a cavity 372 formed between the lower end of sleeve 310 and the nipple portion 338 of housing 314 via the cooperation of the linear sides of the hexagonal portion 314 and the tubular sleeve 310.

Figure 5:
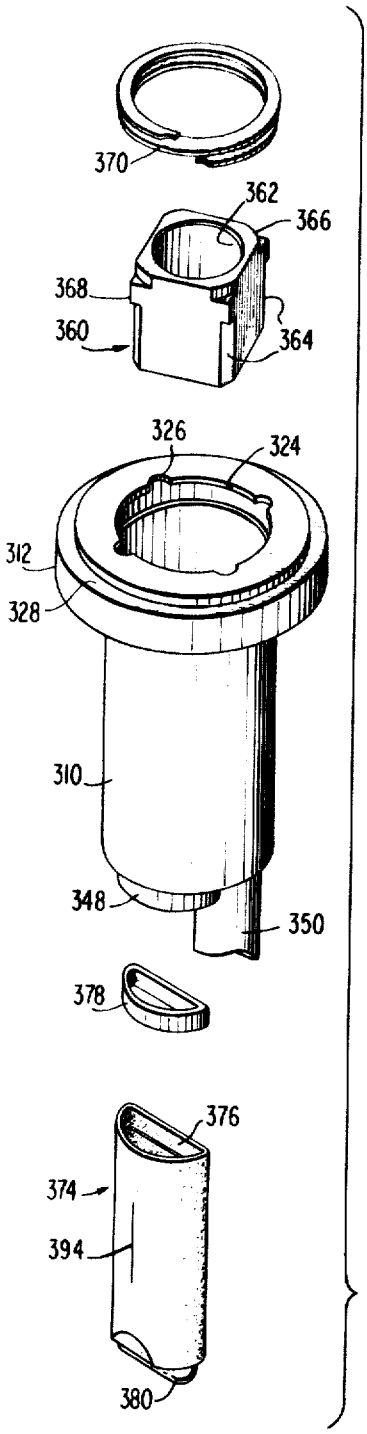
FIGURE 5 is an exploded perspective view of the keg adapter illustrating the parts of the gas check valve, the novel metallic insert and retainer ring hereof prior to assembly.
Figure 6:
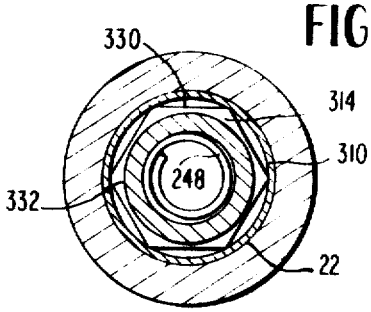
FIGURE 6 is a cross sectional view of the keg adapter in the keg opening and taken about generally on line 6—6 of FIGURE 2.

As best seen in FIGURES 2 and 5, a gas check valve 374 is provided in the form of an elongated flexible tube having the cross sectional shape of a half circle or D-shape. The tube is preferably formed of silicone rubber but may be formed of gum rubber or of plastic materials. The upper end 376 of the D-shaped tube 374 is open and is receivable within the D-shaped nipple 348 of disk 316 at the lower end of adapter unit B. A metal D-shaped insert 378 is disposed within the D-shaped end 376 and, when finally assembled, bears outwardly to press the end portion 376 against the D-shaped nipple 348. A suitable adhesive, such as 108W Silicone Cement manufactured by General Electric Co., may be applied about the flexible tube end 376 prior to assembly to further insure the seal thereof with nipple 348. The closed lower end 380 of gas check valve 374 is provided with a single longitudinal elongated slit 382. Formed in the curved vertical wall 384 of the gas check valve 374 is a second elongated, vertically-extending slit 394 and a third similar slit 396 is formed in the diametrically extending wall 398 thereof. These three slits permit gas under pressure to pass outwardly of gas check valve 374 into the interior of the beer keg 20 but prevent either gas or liquid from flowing outwardly of the keg. A detailed description of the gas check valve 374 is provided in copending application. Ser. No. 676,291, now abandoned. It will be appreciated that all three slits are not necessary and that one or two of any of the three slits will provide a satisfactorily-performing gas check valve.

Figure 7:
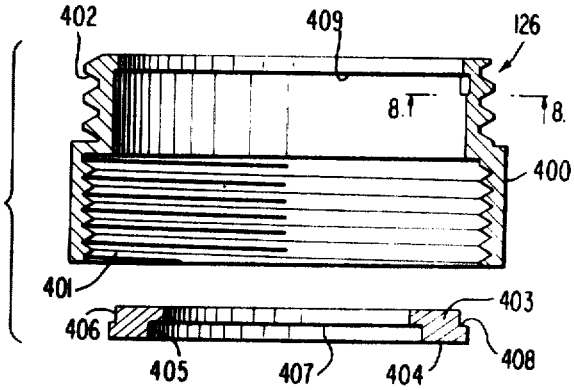
FIGURE 7 is an exploded cross sectional view of the parts forming the retaining collar employed to secure the keg adapter hereof within the keg opening.
Figure 8:
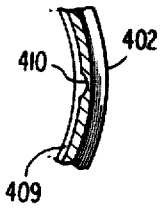
FIGURE 8 is a fragmentary cross sectional view thereof taken about on line 8—8 of FIGURE 7.
Figure 9:
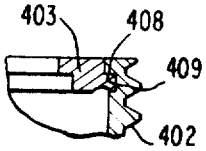
FIGURE 9 is a fragmentary vertical cross sectional view of the parts illustrated in FIGURE 7 in final assembly.

It is a particular feature hereof that the collar 126 is formed of readily available tubular stock rather than machined from bar stock as are the collars on similar units of this type. The great expense of machining the collar from bar stock, normally stainless steel stock, as well as the waste of the material thus machined is by the present invention completely eliminated. Referring now to FIGURES 7–9, collar 126 is formed of a first ring 400 cut from tubular stainless steel stock and provided with internal threads at one end as at 401 and external threads 402 at the opposite end having a larger pitch. To form the radially inwardly extending flange portion 403 of collar 126 as seen in FIGURE 2 and which overlies the annular shoulder 328 of keg unit B, a ring 404, also cut from tubular stock is provided and has stepped inner and outer diameter portions 405 and 406 respectively forming annular shoulders 407 and 408. Ring 404 is inserted within collar 126 with the shoulder 409 on collar 126 retaining the ring from movement through the collar. A notch 410 is formed along the inner bore of collar 126 and ring 404 may be struck as by a hammer to force a portion thereof into notch 410 whereby the ring is fixed within collar 126. In this manner, the retaining collar 126 normally employed on units of this type can be fabricated from low cost, readily available, tubular stock with the assembly of the collar and ring being readily and easily accomplished.

Figure 10:
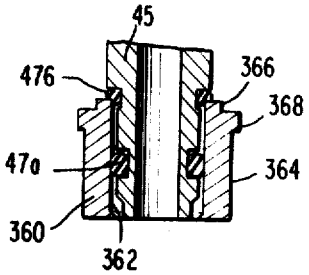
FIGURE 10 is a fragmentary cross sectional view illustrating the novel double seal arrangement on the coupler unit probe hereof and its cooperation with the metallic insert of the keg adapter.

It is another feature hereof that there is provided a unique double seal arrangement (FIGURE 10) on the lower end of probe 45. A seal 47a, comprising an O-ring, is disposed in an annular recess formed about the lower end portion of probe 45 with the O-ring bearing about the bore 362 of metal insert 360. An O-ring seal 47b, formed to a slightly larger diameter than O-ring 47a, seats about the upper periphery of bore 362 through the metal insert 360 whereby the seals 47a and 47b comprise a double seal between the liquid and gas passages. The lower seal 47a prevents spitting of the tapping unit when the coupler unit A is withdrawn from the keg adapter B as the valve 246 normally seats under the bias of spring 248 prior to complete withdrawal of probe 45 from insert 360. Should the lower valve ring 47a abrade or become otherwise damaged as to form an incomplete or ineffective seal about the bore 362, the seal 47b prevents the gas entering keg adapter B through the annular gas passageway in the coupler unit from entering the fluid line and the beer from going wild.

In use, the keg adapter B is readily inserted through and sealed within the keg opening 23 at the brewery by clamping collar 126 about ring 192 and the adapter flange 312 to draw ring 192 against the underside of the keg opening flange while simultaneously clamping an O-ring seal 416 between the collar and keg flanges. When the keg is delivered to the beer dispensing establishment, coupler A is secured to the keg adapter B with the lower end of the probe being inserted within the bore 362 of insert 360. By threading the collar 118 about the collar 126, the probe 45 engages the [bifurcated stem 246] *bifurcations 250 and 252* to open the valve *246* [256] against the bias of spring 243. Gas from the pressure source (not shown) is supplied to the keg through the nipple 144 into the annular area about probe 45 and within head 44 with the gas flowing past the retaining ring 370 and the square sides of insert 360 and downwardly about said cylindrical portion 332 of housing 314 and into the lower cavity 372 past the hexagonal intermediate portion 338 of housing 314 for delivery into check valve 374. The gas enters the keg through the slits 382, 394 and 396 of check valve 374 forcing beer into the lower end of siphon tube 350 past the open valve 246 into probe 45 for ultimate delivery to the faucet 40 via conduit 48.

It will thus be seen that the objects of the invention are fully accomplished in that there has been provided an impoved tapping device comprised of a keg adapter unit having parts formed of all-metal construction (valve parts excepted) and which may be readily secured one to the other as by brazing to form an integral all-metal keg adapter unit. The parts moreover are formed of tubular and bar stock as applicable and are therefore readily fabricated, permitting construction of the keg adapter unit at low cost. Moreover, the foregoing is provided with an improved metal insert and retainer ring further reducing the cost of the parts of the keg adapter and facilitating ready assembly of the valve parts thereof. In addition, there has been provided a unique double seal construction on the coupler unit probe providing a double seal protective feature heretofore unavailable in tapping devices of this type.

The invention may be embodied in other specific forms without departing from the spirit or essential characteristics thereof.

What is claimed and desired to be secured by United States Letters Patent is:

[1. A liquid dispensing apparatus for use with a keg or like container for liquids which has top, bottom and side walls with an opening in one wall of said keg characterized in that it comprises: a keg adapter comprising tubular means insertable into the opening in the one wall from outside said keg and adapted to be secured within the keg wall opening, a gas passage through said tubular means, a check valve in communication with said gas passage through said tubular means, a liquid passage through said tubular means for the transfer of liquid from the inside to the outside of the keg, said liquid passage bypassing said gas passage, a normally-closed valve in said liquid passage, a valve retainer insert in said tubular means, said insert having a hollow, generally polygonal cross section defining a central liquid passage and gas passageways between its sidewalls and the interior of said tubular means, said tubular means having a radially inwardly-projecting shoulder portion, and means for locking said insert in said tubular means including a locking ring engageable between said shoulder portion and said insert.]

[2. Apparatus according to claim 1 wherein said tubular means comprises a sleeve and said shouldered portion includes a radially inwardly-extending annular flange formed about the upper end of said sleeve, said insert having shoulders rotatable within said sleeve below said flange, said flange including notches permitting passage of said shoulders past said flange into said sleeve with said ring being disposed between said flange and said shoulders.]

[3. Apparatus according to claim 1 wherein the upper corner portions of said polygonally-shaped insert are cut back to form a plurality of shoulders, said ring engaging between the respective shouldered portions of said tubular means and said insert.]

[4. Apparatus according to claim 1 wherein the upper end of said tubular means includes a radially inwardly-extending flange forming said shoulder portion thereof, said ring engaging between said insert and the underside of said flange and defining gas passages between said ring and the side walls of said insert.]

[5. A liquid dispensing apparatus for use with a keg or like container for liquids which has top, bottom and side walls with an opening in one wall of said keg characterized in that it comprises: a keg adapter comprising tubular means insertable into the opening in the one wall and adapted to be secured within the keg wall opening, a valve housing within said tubular means having at least a portion thereof polygonal in cross-section, a liquid passage through said valve housing and said tubular means for the transfer of liquid from the inside to the outside of the keg, a gas passage through said tubular means and including the openings formed between the side walls of said polygonal valve housing portion and wall portions of said tubular means, a normally closed valve carried by said valve housing and a check valve in said gas passage.]

[6. Apparatus according to claim 5 wherein said tubular means and said valve housing are formed of metal with the side edges of said polygonally-shaped housing portion being welded to said tubular means.]

7. Apparatus according to claim 5 wherein the liquid passage through the inner portion of said valve housing is laterally offset from the axis of said tubular means, and means closing the inner end portion of said tubular means about said laterally offset liquid passage and defining a laterally offset chamber with said tubular means and said valve housing, said gas check valve being laterally offset and disposed in communication with said chamber.

8. Apparatus according to claim 5 including means enclosing the lower end portion of said tubular means about said liquid passage, said closing means including said gas check valve, the latter comprising an elongated envelope formed of a flexible material having a slit therethrough for permitting ingress of gas through said gas passage into the keg and preventing egress of liquid into said gas passage.

9. Apparatus according to claim 5 including a valve retainer insert in said tubular means, said insert having a hollow, generally polygonal cross-section defining a central liquid passageway in communication with the liquid passage through said valve housing, and gas passageways between the side walls of said insert and wall portions of said tubular means in communication with said openings, and means locking said insert in said tubular means.

10. Apparatus according to claim 5 wherein said valve housing includes an outer cylindrical portion having a diameter less than the diameter of said tubular means to define an annular gas passageway therebetween in communication with said openings, the inner end portion of said valve housing terminating in a laterally offset nipple, and means closing the inner end portion of said tubular means about said nipple and having an opening therethrough in communication with said gas passage and said gas check valve.

[11. Apparatus according to claim 5 wherein said valve housing is formed of metal bar stock having a polygonal cross section.]

12. Apparatus according to claim 5 wherein said tubular means includes a metal sleeve, said valve housing being formed of metal and including an inwardly projecting nipple defining a portion of said liquid passage, said keg adapter including a metal disk having an opening for receiving said nipple and an opening for receiving said gas valve, said valve housing and said disk being welded to said sleeve.

[13. Apparatus according to claim 5 wherein said valve housing portion comprises a regular polygon in cross section.]

[14. Apparatus according to claim 13 wherein said tubular means and said valve housing are formed of metal, and means for securing said valve housing to said tubular means.]

15. Apparatus according to claim 9 wherein said tubular means includes a sleeve having a radially inwardly-extending annular flange, said insert having shoulders rotatable within said sleeve below said flange, said flange including notches permitting passage of said shoulders past said flange into said sleeve, said locking means including a ring disposed between said flange and said shoulders.

16. Apparatus according to claim 9 including a dispensing coupling unit for dispensing liquid from the keg, said dispensing coupling unit comprising: a coupler head having a member disposed therein forming a liquid passage, means through said coupler head, gas passage means in said coupler head, said liquid passage means and said gas passage means being segregated one from the other and means for securing said coupler unit about the keg wall opening with said liquid passage means in communication with said liquid passageway in said insert and said gas passage means in communication with said gas passageways defined by the respective side walls and wall portions of said insert and tubular means.

17. Apparatus according to claim 7 wherein said gas check valve comprises an elongated envelope open at one end in communication with said gas passage and formed of a flexible material, said envelope having a slit therethrough for permitting ingress of gas from said gas passage into the keg and preventing egress of liquid into said gas pasage, said closing means including a flange and a band within the open end of said envelope pressing the latter against said flange to form a seal therewith.

18. Apparatus according to claim 12 wherein said tubular means includes an annular flange about the outer end of said sleeve, said flange being formed of metal and welded to said sleeve whereby said valve housing, sleeve, disk and flange form a unitary all metal keg adapter.

[19. Apparatus according to claim 1 including a siphon tube in communication at one end with said liquid passage through said valve housing, said siphon tube terminating at its other end in an outwardly flared inlet.]

20. A liquid dispensing apparatus for use with a keg or like container for liquids which has top, bottom and side walls with a neck-opening in one wall of the keg having a flange spaced from said one wall characterized in that it comprises: a keg adapter comprising tubular means insertable into the opening in the one wall from outside the keg and having a flange engageable about the flange of the keg opening, a liquid passage through said tubular means for the transfer of liquid from the inside to the outside of the keg, a normally closed valve in said liquid passage, a gas passage through said tubular means, a check valve in said gas passage for permitting ingress of gas through said tubular means into the keg and means for retaining said keg adapter within the keg opening and including an externally threaded ring engageable with the underside of the keg opening flange, an internally threaded collar for threadedly engaging about said ring, and a second ring having an inwardly-directed flange overlying said adapter flange, said second ring being clamped between said collar and the keg opening flange when said collar and said externally threaded ring threadedly engage one another.

21. Apparatus according to claim 20 wherein said collar and said second ring are formed from tubular stock.

22. Apparatus according to claim 21 wherein said collar and said second ring have respective complementary internal and external stepped diametrical portions, and means for securing said collar and said second ring one to the other.

23. Apparatus according to claim 22 including a groove formed in the internal wall of said collar, said securing means including a portion of said second ring receivable within said groove.

24. Apparatus according to claim 20 including a siphon tube in communication at one end with said liquid passage through said valve housing, said siphon tube terminating at its other end in an outwardly flared inlet.

[25. Apparatus adapted for use in tapping a keg or like container for storing liquids such as beer, said keg having top, bottom, and side walls with an opening in at least one wall of said keg, the keg wall opening being sealed by a keg adapter unit having a cylindrical bore and a dispensing coupler unit connected to said keg adapter for dispensing liquid from the keg, said dispensing coupler unit subcombination comprising: a coupler head having a probe disposed therein forming a liquid passage means through said coupler unit, gas passage means in said coupler head, said liquid passage means and said gas passage means being segregated one from the other, one end of said probe projecting from said coupler head for engagement within the cylindrical bore of the keg adapter unit, said probe carrying a pair of axially-spaced sealing rings having different diameters, the outermost sealing ring having a smaller diameter than the diameter of the inner ring and being receivable within the cylindrical bore of the keg adapter, the larger diameter sealing ring being adapted to seal about the opening of the cylindrical bore to provide a double seal through the bore when said coupler unit and the keg adapter unit are operably connected one to the other.]

[26. A liquid dispensing apparatus adapted for use with a keg or like container for liquids which has a top, bottom and side walls with an opening in one wall of said keg characterized in that it comprises; a keg adapter including a metal main body adapted to be secured within the keg wall opening, said main body including a central annular portion having a liquid passage extending therethrough for transfer of liquid from the inside to the outside of a keg; normally closed liquid valve means in the liquid passage through said central portion, said main body including a sleeve defining with said central portion an annular gas passage therebetween and bypassing said liquid passage and said liquid valve means for transmitting gas through said adapter from the outside to the inside of the keg, means interrupting a portion of said annular gas passage to form a plurality of circumferentially spaced passageways about said liquid passage and gas valve means carried by said adapter body and associated with said gas passage for permitting in a valve open position flow of gas toward the inside of the keg and preventing in a valve closed position flow of liquid from a keg into said gas passage.]

[27. Apparatus according to claim 26 wherein said gas valve means includes a flexible member.]

[28. Apparatus according to claim 26 wherein said central portion includes a substantially annular shoulder and a valve seat, said liquid valve means including a valve stem and a spring seating on said annular shoulder and urging said valve stem toward said seat to maintain said liquid valve means in a normally closed position.]

[29. Apparatus according to claim 28 including a siphon tube extending from the lower end of said adapter body in communication with the liquid passage therethrough.]

[30. Apparatus according to claim 26 wherein said adapter body includes a substantially radially outwardly directed flange, and a sealing ring between said flange and the marginal portions of the keg about the opening.]

*31. A liquid dispensing apparatus adapted for use with a keg or like container for liquids which has a top, bottom and side walls with an opening in one wall of said keg surrounded by a conventional unthreaded keg neck including a flange extending laterally therefrom and spaced from said one wall and for further use with a liquid dispensing coupler characterized in that it comprises: a keg adapter having a liquid passage therethrough for transfer of liquid from the inside to the outside of a keg and a gas passage therethrough for the transfer of gas from the outside to the inside of the keg, said keg adapter including a generally tubular main body having an upper laterally enlarged portion and a lower reduced portion adapted to be secured within the keg wall opening with said laterally enlarged portion adapted to overlie the keg neck flange, said keg adapter including a central annular portion defining a liquid passageway, said liquid passageway forming at least a part of said liquid passage through said keg adapter; normally closed liquid valve means in said liquid passage, said tubular body defining with said central portion an annular gas passageway therebetween, said gas passageway forming at least a part of said gas passage through said keg adapter; means interrupting a portion of said gas passage to form a plurality of circumferentially spaced gas passageways about said liquid passage, gas valve means carried by said keg adapter and associated with said gas passage for permitting in a valve open position flow of gas toward the inside of the keg and preventing in a valve closed position flow of liquid from the keg through said gas passage, retaining means for securing said adapter in the keg opening and including a generally annular portion substantially coaxially arranged with said tubular body and releasably engageable with the upper laterally enlarged portion thereof, said latter mentioned annular portion being adapted to surround the keg neck flange when the adapter is installed in the keg, and being externally threaded for threaded connection with a liquid dispensing coupler, said retaining means further including a pair of laterally inwardly extending projections for underlying the keg flange to clamp the keg neck flange between said upper laterally enlarged portion of said adapter and said projections, and sealing means adapted to be disposed about the keg opening between the keg neck and said body for sealing the adapter about the keg opening.*

*32. A liquid dispensing apparatus according to claim 31 including a liquid dispensing coupler having a head, means for connecting said coupler to said adapter including an internally threaded collar rotatably carried by said coupler head for threaded engagement with said externally threaded annular portion, said coupler head including a probe for opening said liquid valve means in said adapter when said dispensing coupler is connected to said adapter, said probe defining a portion of a liquid passage through the coupler head in communication with said liquid passage in said adapter when said coupler is connected to said adapter, said coupler head having a gas passage in communication with said gas passage in said adapter when said coupler is connected to said adapter, and sealing means cooperable with said coupler and said adapter for maintaining said liquid and gas passages segregated one from the other when said coupler is connected to said adapter.*

*33. A liquid dispensing apparatus according to claim 31 in combination with a keg having top, bottom and side walls with an unthreaded opening in said top wall surrounded by a conventional unthreaded keg neck, said opening having a diameter of about ¾ inch, said neck including an interrupted flange defining two flange portions extending laterally from the keg neck and spaced from said top wall, said projections being receivable between said flange portions and engaging the underside of said flange portions upon rotation thereof.*

References Cited

The following references, cited by the Examiner, are of record in the patented file of this patent or the original patent.

UNITED STATES PATENTS

| | | | |
|---|---|---|---|
| 341,555 | 5/1886 | Collins et al. | |
| 2,223,012 | 11/1940 | Wanderski et al. | 222—400.7 |
| 2,638,914 | 5/1953 | Flaith et al. | |
| 3,065,883 | 11/1962 | Nelson | 222—399 X |
| 2,539,349 | 1/1951 | Giles | 222—400.7 |
| 3,065,885 | 11/1962 | Chatten | 222—400.7 |
| 3,361,152 | 1/1968 | Akers | 222—400.7 X |

FOREIGN PATENTS

| | | |
|---|---|---|
| 103,116 | 5/1899 | Germany. |
| 697,799 | 9/1953 | Great Britain. |
| 930,015 | 7/1963 | Great Britain. |

STANLEY H. TOLLBERG, Primary Examiner

UNITED STATES PATENT OFFICE

CERTIFICATE OF CORRECTION

Patent No. RE. 27,627 Dated April 17, 1973

Inventor(s) M. S. Johnston

It is certified that error appears in the above-identified patent and that said Letters Patent are hereby corrected as shown below:

Column 7, line 2, "Value" should read --Valve--; line 14, "flanges" should read --flange--; line 17, "D-shapped" should read --D-shaped--; line 39, "anular" should read --annular--.

Column 8, line 23, "rings" should read --ring--.

Column 9, line 24, "bearing" should read -- beaming -- .

Column 11, line 75, Claim 17, "pasage" should read --passage--.

Signed and sealed this 20th day of November 1973.

(SEAL)
Attest:

EDWARD M.FLETCHER,JR.
Attesting Officer

RENE D. TEGTMEYER
Acting Commissioner of Patents

Disclaimer

Re. 27,627.—*Mack S. Johnson*, Rolling Hills, Calif. BEER TAPPING DEVICE. Patent dated Apr. 17, 1973. Disclaimer filed June 11, 1973, by the assignee, *Draft Systems, Inc.*

Hereby disclaims the portion of the term of the patent which extends beyond Jan. 25, 1983.

[*Official Gazette April 29, 1975.*]